(12) United States Patent
Grumer

(10) Patent No.: US 11,047,428 B2
(45) Date of Patent: Jun. 29, 2021

(54) CLUTCH FOR SIMPLIFIED INSTALLATION

(71) Applicant: Schaeffler Technologies AG & Co. KG, Herzogenaurach (DE)

(72) Inventor: Friederike Grumer, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 263 days.

(21) Appl. No.: 16/314,873

(22) PCT Filed: Jul. 31, 2017

(86) PCT No.: PCT/DE2017/100638
§ 371 (c)(1),
(2) Date: Jun. 21, 2019

(87) PCT Pub. No.: WO2018/024290
PCT Pub. Date: Feb. 8, 2018

(65) Prior Publication Data
US 2019/0301539 A1    Oct. 3, 2019

(30) Foreign Application Priority Data

Aug. 4, 2016   (DE) .................... 10 2016 214 442.1
Oct. 13, 2016  (DE) .................... 10 2016 219 998.6

(51) Int. Cl.
*F16D 13/70*   (2006.01)
*F16D 13/75*   (2006.01)

(52) U.S. Cl.
CPC ............ *F16D 13/70* (2013.01); *F16D 13/75* (2013.01); *F16D 2250/0084* (2013.01); *F16D 2300/12* (2013.01); *F16D 2300/26* (2013.01)

(58) Field of Classification Search
CPC .......... B60W 30/18072; B60W 50/06; B60W 2540/103; B60W 2710/1005;
(Continued)

(56) References Cited

U.S. PATENT DOCUMENTS 5,421,441 A  *  6/1995  Mason ................... B65G 39/12
                                                193/35 R
5,924,538 A      7/1999  Kimura
(Continued)

FOREIGN PATENT DOCUMENTS

DE          3221971 A1     1/1983
DE     102011018590 A1    10/2012
DE     102014201734 A1     8/2014

*Primary Examiner* — David J Hlavka
(74) *Attorney, Agent, or Firm* — Kevin L. Parks

(57) ABSTRACT

A clutch for a drivetrain of a motor vehicle includes an axis and a pressure plate assembly. The pressure plate assembly has a clutch cover, a contact plate held movably on the clutch cover, a diaphragm spring with a radial inner edge region, and a pressure element for actuating the diaphragm spring. The diaphragm spring is braced between the clutch cover and the contact plate. The pressure element rests against the radial inner edge region. The pressure element includes a first through hole and the clutch cover includes a second through hole. The first through hole is axially aligned with the second through hole. In some embodiments, the clutch has a clutch disk with a hub region having a third through hole, and the third through hole is axially aligned with the first through hole and the second through hole.

15 Claims, 6 Drawing Sheets

(58) Field of Classification Search
CPC ..... B60W 2050/0011; B60W 2710/021; F16D 2500/31453; F16D 48/066; F16D 2500/10412; F16D 2500/108; F16D 2500/5085; F16D 2500/70406; F16D 2500/70488; F16D 2500/7106; F16D 2500/3065; F16D 2500/3024; F16D 48/06
See application file for complete search history.

(56) References Cited

U.S. PATENT DOCUMENTS

| | | | | |
|---|---|---|---|---|
| 5,967,939 | A * | 10/1999 | Reik | B60W 10/02 |
| | | | | 477/77 |
| 6,024,199 | A * | 2/2000 | Uenohara | F16D 13/757 |
| | | | | 192/111.2 |
| 6,264,019 | B1 * | 7/2001 | Uehara | F16D 13/757 |
| | | | | 192/111.19 |
| 2003/0051965 | A1 * | 3/2003 | Hirt | F16D 23/12 |
| | | | | 192/52.1 |

\* cited by examiner

CLUTCH FOR SIMPLIFIED INSTALLATION

CROSS-REFERENCE TO RELATED APPLICATIONS

This application is the United States National Phase of PCT Application No. PCT/DE2017/100638 filed Jul. 31, 2017, which claims priority to German Application Nos. DE102016214442.1 filed Aug. 4, 2016 and DE102016219998.6 filed Oct. 13, 2016, the entire disclosures of which are incorporated by reference herein.

TECHNICAL FIELD

The disclosure relates to a clutch for a drivetrain of a motor vehicle, such as a motor-driven two-wheeled vehicle/motorcycle, passenger car, etc., having a pressure plate assembly, the pressure plate assembly further having a clutch cover, a contact plate held movably on the clutch cover, a diaphragm spring braced between the clutch cover and the contact plate, and a pressure element which rests against a radial inner edge region of the diaphragm spring to actuate the diaphragm spring. The disclosure also relates to a clutch system having a clutch as well as an operating system that moves the clutch between an engaged position and a disengaged position.

BACKGROUND

Clutches and clutch systems of this species are sufficiently known from the prior art. DE 10 2014 201 734 A1, for example, discloses a clutch control device for a friction clutch, having a housing and a control device tiltably connected to the housing by means of a bearing device. The control device is connected to the bearing device to cause an axial movement of a contact plate. A compensation unit is positioned between the housing and the control device, and is in force-transmitting contact with both. In addition, the compensation unit is positioned so that it is compression-loaded when the control device is tilted.

However, known clutches, such as single-plate dry clutches, are relatively expensive to install in the drivetrain. For the most part, the individual elements of the clutch must be installed separately and sequentially in the drivetrain, i.e., on the crankshaft side or the transmission side, by the final manufacturer. In addition, it is frequently the case with known clutches that as the wear of the friction linings increases they require relatively large manual lever forces to operate.

SUMMARY

A pressure element is provided with a plurality of first through holes and a clutch cover with a plurality of second through holes, with each first through hole being aligned with a second through hole in the axial direction of the clutch.

This enables the pressure plate assembly to be installed in its entirety and reduces the installation steps. At the same time, since the pressure plate assembly is already preassembled at the factory, the individual clutch elements are already preset, so that this too has a positive effect on reducing the manual lever force as much as possible.

The pressure element may have a disk region extending away from the diaphragm spring in the radial direction (of the clutch/of an axis of rotation of the clutch), e.g., inward, in which region the first through holes are made (e.g., distributed in a circumferential direction of the clutch), simplifying assembly of the pressure element and thus also of the clutch.

In this respect, the clutch cover may have a flange region overlapping the diaphragm spring in the radial direction inward, in which the second through holes (e.g., distributed in the circumferential direction of the clutch) are made. This further simplifies construction of the clutch.

If a clutch disk is present whose hub region has a plurality of third through holes (e.g., distributed in the circumferential direction of the clutch), the entire clutch may be installed in one step.

If every third through hole is aligned with a first through hole and/or a second through hole, each fastening element to be inserted into the clutch cover, for example, a screw, may be installed simply from outside by means of a tool.

Furthermore, the second through holes in the clutch cover may be smaller in diameter than the first through holes in the pressure element (and/or than the third through holes in the hub region). This permits the through holes in the clutch cover to guide the fastening elements.

Furthermore, the clutch may have a ring-shaped counter-pressure plate whose inside diameter is greater than the outside diameter of an imagined circle (running in a circumferential direction around the axis of rotation), on which the through holes of the clutch cover, the pressure element and/or the hub region are positioned, permitting access of the tool for installation.

The pressure element may be braced by an auxiliary spring, e.g., a servo spring, to further reduce the manual lever force/disengaging force. Through the use of a servo spring, there is little increase of force over the life of the manual lever.

In addition, the pressure element may be positioned between the diaphragm spring and the auxiliary spring, and/or is centered on one or more centering pins for centering the diaphragm spring. This achieves a compact construction of the clutch.

The clutch cover may be made of a cast material, e.g., cast iron or cast steel, so that the clutch cover is designed as an inertial mass.

In this connection, the counterpressure plate may be produced from a cast material, e.g., cast iron or cast steel, and/or may be designed as a flywheel. This material configuration of the counterpressure plate allows a greater rigidity and a greater centrifugal mass.

The hub region of the clutch disk may be designed as a forged hub, e.g., as a one-piece forged hub making construction of the clutch even more robust.

The clutch may be designed as a dry/dry-running friction clutch making operation of the clutch more efficient.

Furthermore, the clutch may be designed as a single-plate clutch. Alternatively to this, a design of the clutch as a multi-plate clutch is also conceivable, as long as it is actuated by means of the diaphragm spring. A design as a servo clutch also makes for effective operation of the clutch.

Furthermore, the disclosure relates to a clutch system having a clutch according to at least one of the embodiments described above, as well as an actuating system that moves the clutch between an engaged position and a disengaged position. The actuating system has an actuating element that couples the clutch immovably with the pressure element, partially protruding. The actuating element is designed, for example, as a push rod or a pull element. This also constructs a clutch system effectively.

In other words, a dry motorcycle clutch having one clutch disk is configured, which is designed as a servo clutch. In order to simplify the installation of the clutches by the motorcycle manufacturer, a completely assembled clutch, having the pressure plate assembly with the clutch cover consisting of cast material, for example, the clutch disk, and the counterpressure plate designed as a flywheel, can be fastened to the crankshaft of the combustion engine. The hub of the clutch disk, the pressure plate (pressure element), which acts on the diaphragm spring, and the clutch cover are provided with through holes distributed in the circumferential direction, through which the fastening elements, e.g., connecting bolts, are inserted during installation, so that the clutch cover is screwed to the crankshaft without first having to take apart the clutch. In the event that the clutch is not to be installed as a unit by the motorcycle manufacturer, but rather that the pressure plate assembly is to be installed first, and the clutch disk and the counterpressure plate afterward, in another design at least the pressure plate and the clutch cover are furnished with through holes. This may be necessary, for example, to save costs, when the two-part version of the disk hub (hub region) is used.

Furthermore, the diameter of the through holes in the clutch cover may be smaller than the diameter of the through holes in the pressure plate, and—if applicable—in the hub (hub region) of the clutch disk. The counterpressure plate is ring-shaped, with the inside diameter of the ring being greater than the outside diameter of the circle on which the through holes are positioned in the contact plate. The pressure plate may be held in position between the diaphragm spring and an auxiliary spring, which may be designed as a servo spring, and is braced on the diaphragm spring centering pin. The hub of the clutch disk may be designed as a one-piece forged hub, through which the through holes extend. The clutch may be actuated on the part of the transmission, by a push rod which extends through the transmission input shaft and acts on the pressure plate in order to disengage the clutch. Alternatively, however, actuation by pulling on the part of the combustion engine would also be possible, if the clutch were not flange-mounted directly on the crankshaft of the combustion engine by means of its clutch cover.

BRIEF DESCRIPTION OF THE DRAWINGS

The disclosure will now be explained in greater detail below on the basis of figures; various exemplary embodiments are depicted in this connection.

DETAILED DESCRIPTION

The figures are merely schematic in nature, and serve to aid in understanding the disclosure. The same elements are provided with the same reference labels.

Figure 9:
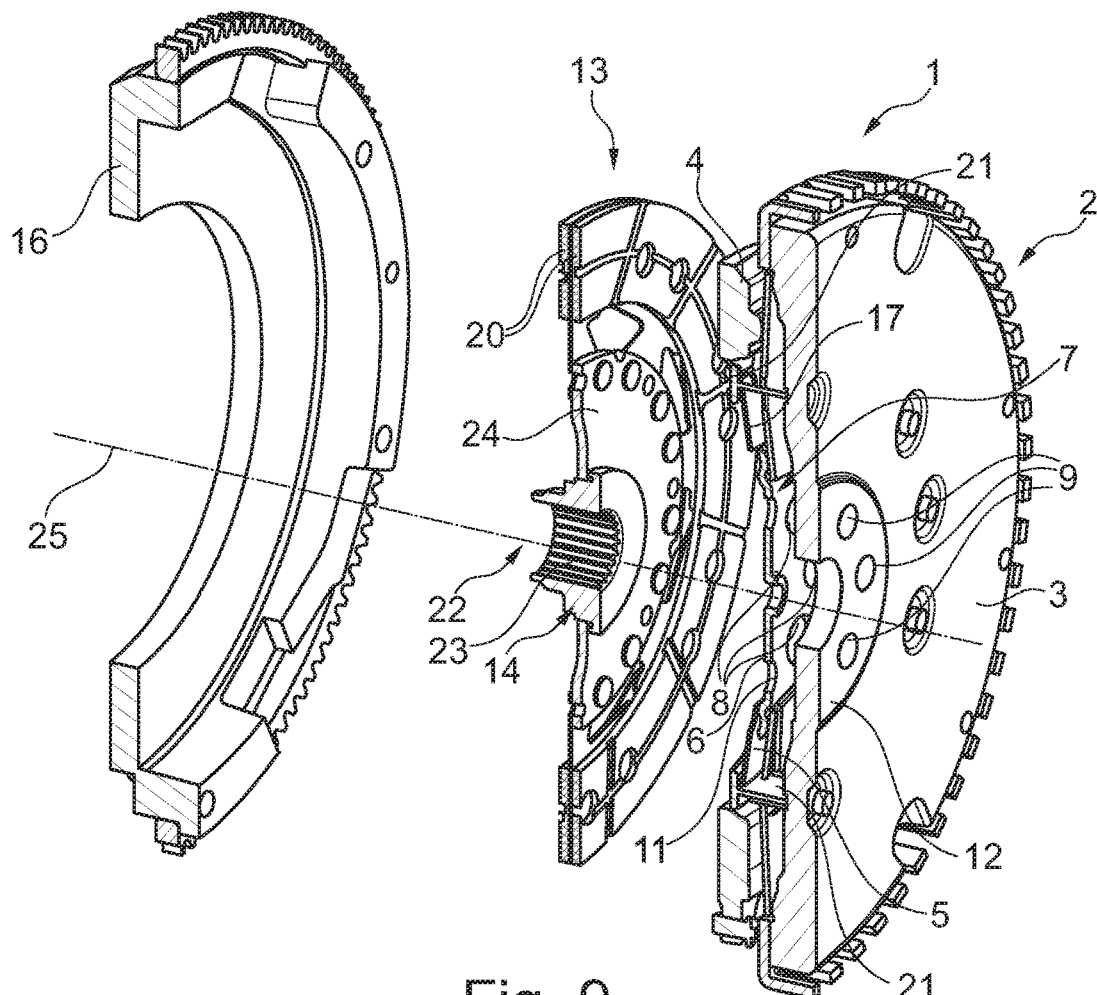
FIG. 9 shows a perspective view of a partially exploded clutch according to another, second exemplary embodiment, which exemplary embodiment differs from the first exemplary embodiment in particular in that the clutch disk is designed in two pieces in the hub region.
Figure 10:
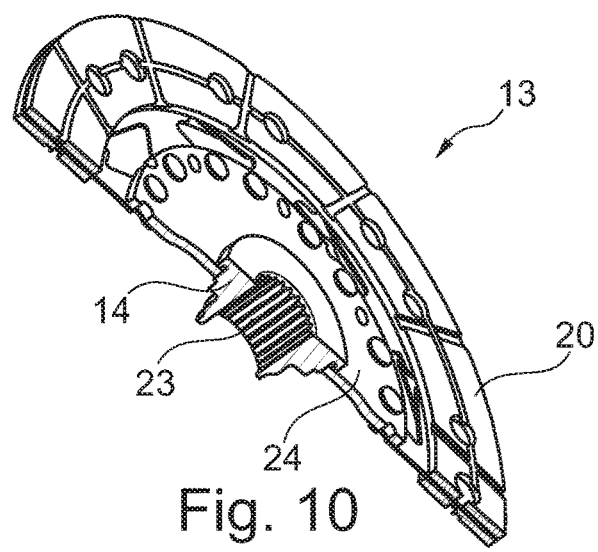
FIG. 10 shows a perspective view in longitudinal section of the clutch disk as it is utilized in FIG. 9.

FIGS. 1 through 8 illustrate a first exemplary embodiment of a clutch 1. The second exemplary embodiment according to FIGS. 9 and 10 is constructed and functions in principle in accordance with the first exemplary embodiment, for which reason, with regard to the second exemplary embodiment, only the differences from the first exemplary embodiment are described below.

Figure 1:
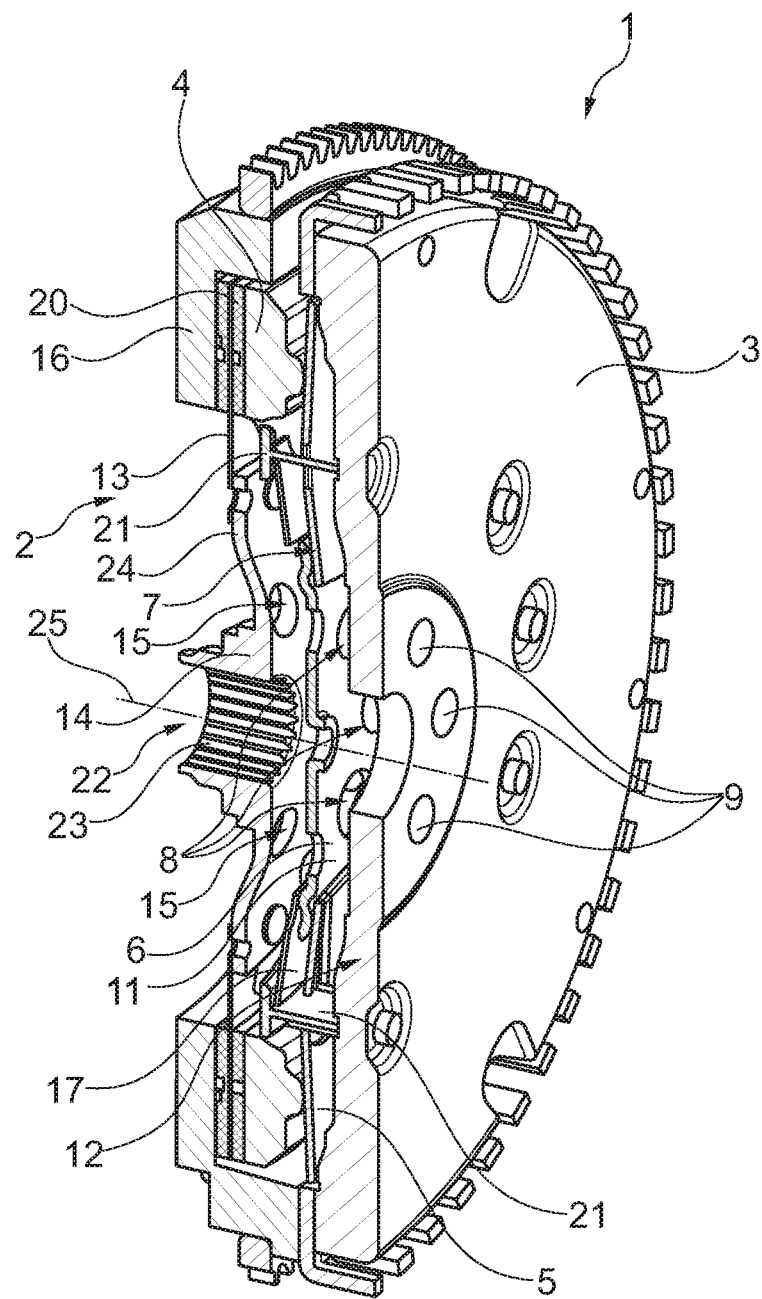
FIG. 1 shows a perspective view in longitudinal section of a clutch according to a first exemplary embodiment, wherein the clutch may be recognized by its clutch cover.
Figure 2:
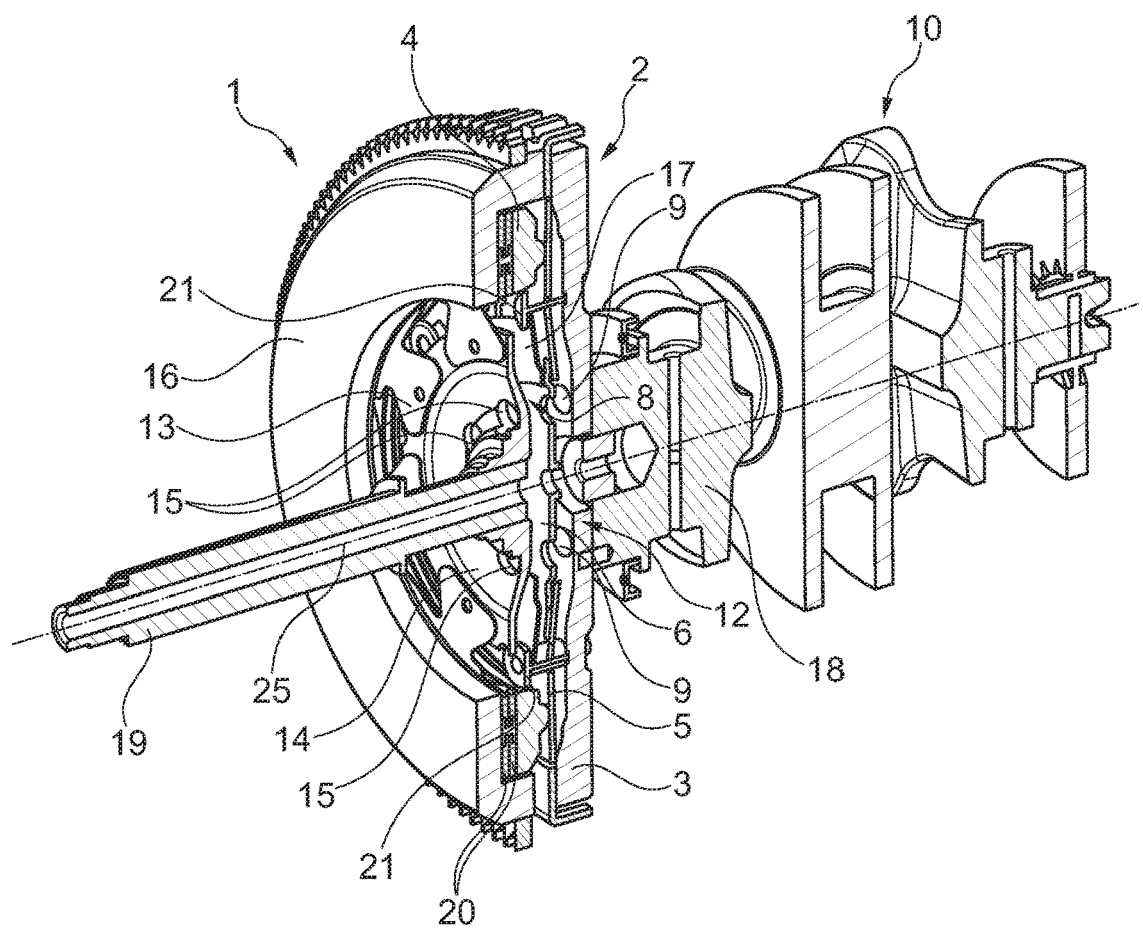
FIG. 2 shows a perspective view in longitudinal section of part of a drivetrain including the clutch according to FIG. 1, wherein a clutch disk is already pushed onto a transmission input shaft so that it cannot rotate, and the clutch cover of the clutch is already positioned against an output shaft of a combustion engine.

Returning to the clutch 1 of the first exemplary embodiment, its construction is clearly recognizable in FIG. 1. Furthermore, as shown in FIG. 2, this clutch 1 serves in the usual way as an uncouplable torque-transferring device, i.e., for optionally connecting and disconnecting an output shaft 18, in the form of a crankshaft, of a combustion engine, to/from a transmission shaft 19 of a transmission. Other elements of the combustion engine and of the transmission are not shown here, in the interest of clarity. The clutch 1 is designed here as a friction clutch and a single plate clutch.

The clutch 1 has, in a typical way, a clutch cover 3, which is connected non-rotatingly to the output shaft 18 when the clutch 1 is in operation/in the installed state. Also connected non-rotatingly to the clutch cover 3 is a counterpressure plate 16/pressure plate. In turn, a clutch disk 13 of the clutch 1 is connected non-rotatingly to the transmission shaft 19. Furthermore, a contact plate 4 is present, which is held on the clutch cover 3 so that it is movable in the axial direction and is non-rotating. The clutch disk 13 is positioned between the counterpressure plate 16 and the contact plate 4 in such a way that its radially outer friction linings 20 (in relation to an axis of rotation 25 of the clutch) are pressed non-rotatingly against the counterpressure plate 16 by the contact plate 4 when the clutch 1 is in an engaged position. In a disengaged position, the contact plate 4 is positioned pressure-free relative to the clutch disk 13/the friction linings and the counterpressure plate 16, in such a way that no torque is transmitted from the output shaft 18 to the clutch disk 13.

In order to move the contact plate 4 in a typical way in the axial direction between the engaged position and the disengaged position, a diaphragm spring 5 is provided, which is pivoted in its pivot position by means of an actuating system, for example a central clutch release bearing (not shown in further detail here for the sake of clarity), to achieve the engaged or disengaged position. The diaphragm spring 5 is coupled non-movably with a pressure element 6, which is designed here as a disk. The diaphragm spring 5 itself is attached to the clutch cover 3 so that it can pivot about a pivot point, which is fixed by means of a plurality of centering pins 21 distributed in the circumferential direction. The pivoting movement of the diaphragm spring 5 occurs by means of cams in the clutch cover 3 and on the contact plate 4. The centering pins 21 also serve to secure the diaphragm spring 5 radially. The pressure element 6 rests against a radially inner edge region 7 of the diaphragm spring 5. In particular, the diaphragm spring 5 is provided with a plurality of diaphragm spring tongues in this edge region 7. The edge region 7 is the region which is located radially inside the centering pins 21.

In this exemplary embodiment, the pressure element 6 is designed as a sheet metal disk/of sheet metal, and is therefore also referred to as a pressure plate. One disk region 11 of the pressure element 6 extends inward in the radial direction so far that it partially overlaps a central through opening 22 in the clutch disk 13 inward in the radial direction. Consequently, the pressure element 6 has a smaller minimum diameter than the clutch disk 13.

Figure 3:
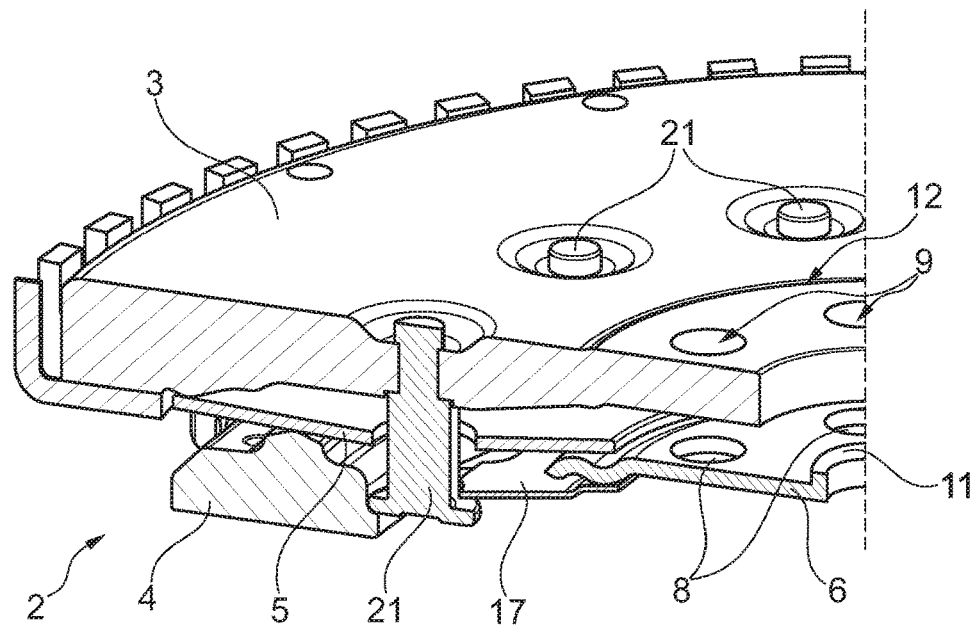
FIG. 3 shows a perspective view in longitudinal section of a pressure plate assembly, as it is utilized in FIG. 1, wherein the various components of the pressure plate assembly are clearly recognizable.

FIG. 3 shows in detail that an auxiliary spring 17, which is designed as a servo spring, is provided for additional support of the diaphragm spring 5. The auxiliary spring 17 is braced on the centering pin 21 and the pressure element 6. The auxiliary spring 17 thus pre-stresses the diaphragm spring 5 indirectly in the axial direction relative to the clutch cover 3. The auxiliary spring 17 is also visible by itself in FIG. 7.

For a plurality of contact points on a centering pin 21 distributed in the circumferential direction, the servo spring 17 has correspondingly shaped arms/lugs protruding outward in the radial direction/projections 26. Thus, the servo spring 17 rests against the pressure element 6 under pre-stressing, so that by actuating the pressure element 6 the servo spring 17 is actuated.

Figure 4:
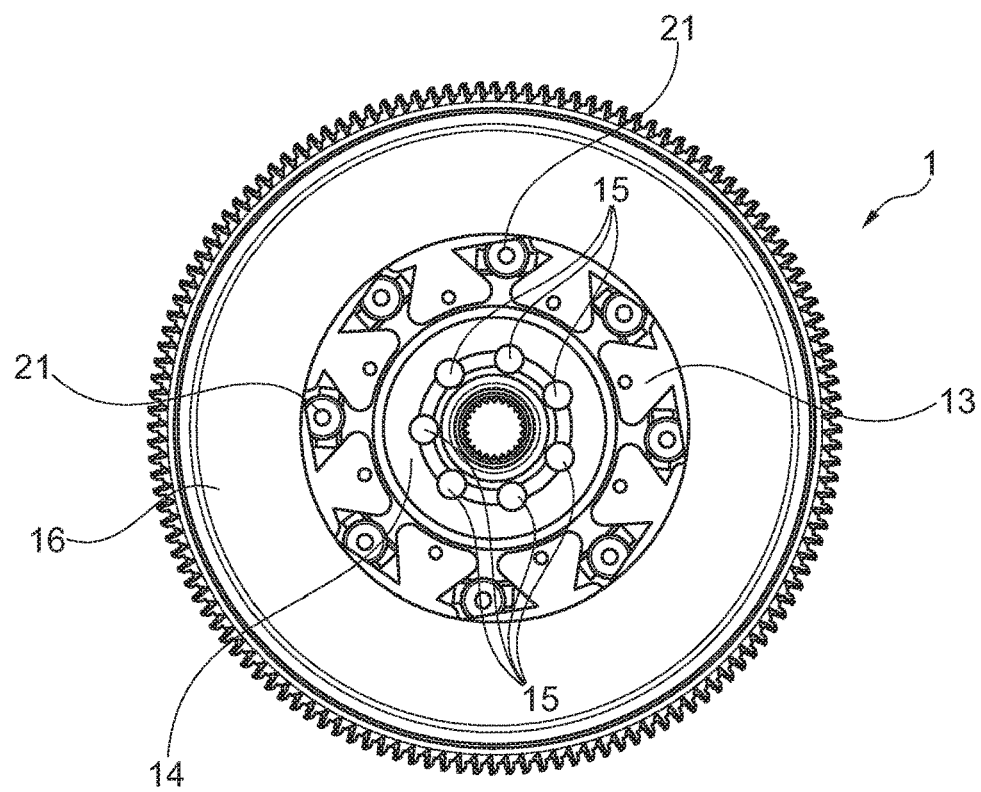
FIG. 4 shows a front view of the clutch according to FIG. 1 in full view.
Figure 5:
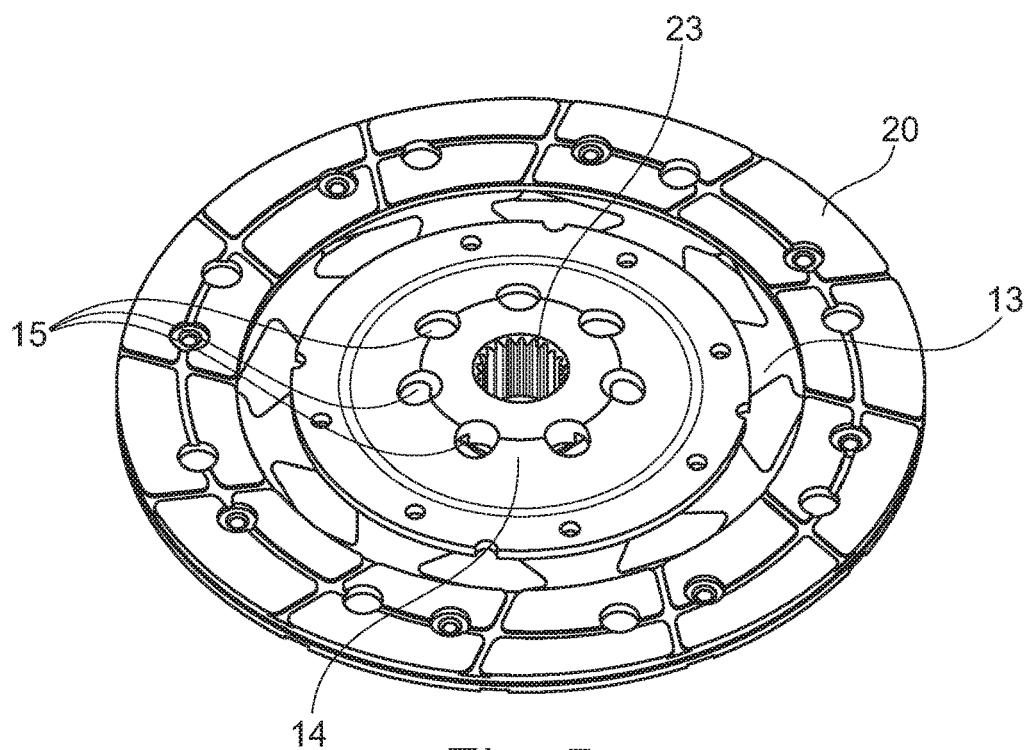
FIG. 5 shows a perspective view of a clutch disk utilized in the clutch according to FIG. 1.
Figure 6:
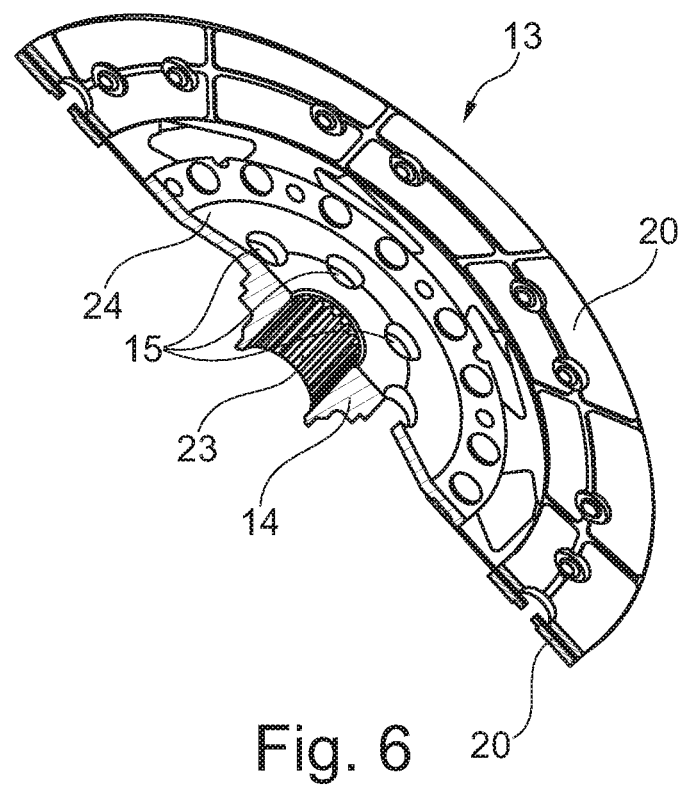
FIG. 6 shows a perspective view in longitudinal section of the clutch disk from FIG. 5.
Figure 7:
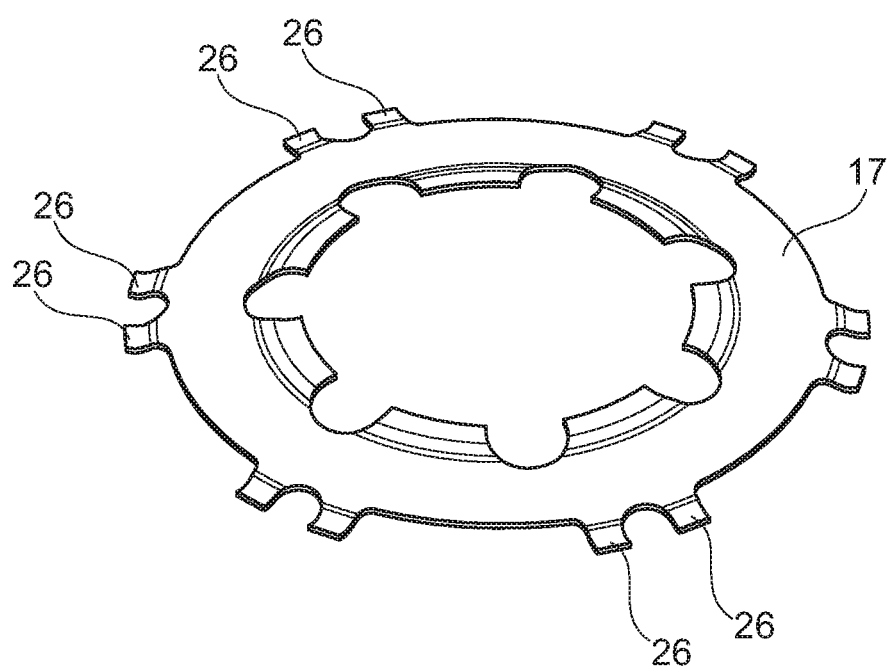
FIG. 7 shows a perspective view of an auxiliary spring/servo spring utilized in the clutch according to FIG. 1.

As illustrated furthermore in FIGS. 4 through 6, the clutch disk 13 according to the first exemplary embodiment has a one-piece hub, which thus forms a one-piece hub region 14. The hub region 14 is designed as forged part. The hub region 14 has in a typical manner, on a radial inner surface, a spline toothing which delimits the through opening 22 toward the outside, which is connected non-rotatingly to the transmission shaft 19 during operation, as shown already in FIG. 2. At one axial end of the spline toothing 23, the hub region 14 then extends outward in the radial direction, forming a connecting flange 24. Radially outside, the fiction linings 20 are attached non-rotatingly to the connecting flange 24.

Figure 8:
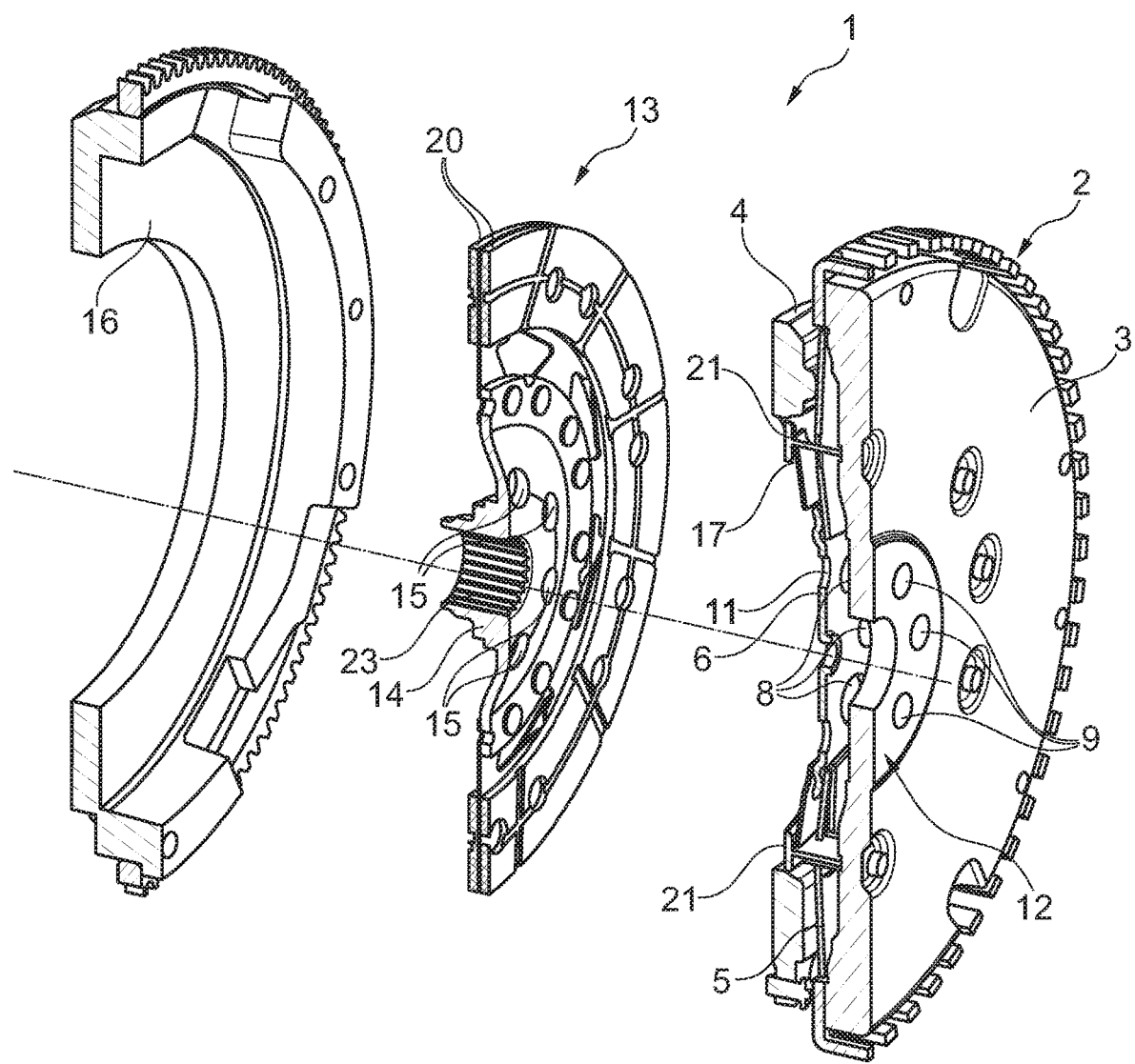
FIG. 8 shows a perspective, partially exploded view of the clutch depicted in longitudinal section in FIG. 1.

FIG. 8 shows that the clutch 1 is essentially made up of three sub-assemblies. To this end, the counterpressure plate 16, the clutch disk 13 and a pressure plate assembly 2 are each realized as a sub-assembly in the clutch 1. The pressure plate assembly 2 as a sub-assembly is a pre-assembled unit, and includes of a plurality of components, in particular the clutch cover 3, the centering pins 21 attached to the clutch cover 3, the contact plate 4, the diaphragm spring 5, the auxiliary spring 17 and the pressure element 6.

The clutch cover 3 is made of a cast material, e.g., a cast iron or cast steel. At an area located radially inside, the clutch cover 3 forms a flange region 12, which is prepared for attachment to a face of the output shaft 18. In particular, this flange region 12 has a plurality of through holes 9, which are referred to below as second through holes 9. The second through holes 9 are distributed in the circumferential direction. A plurality of first through holes 8, likewise distributed in the circumferential direction, are made in the pressure element 6, namely in the disk region 11. The flange region 12 and the pressure element 6 are arranged side-by-side in the axial direction and oriented relative to one another in the radial direction in such a way that each first through hole 8 aligns with a second through hole 9 (in the axial direction of the clutch 1/axis of rotation 25). In addition, the second through holes 9 are smaller in diameter than the first through holes 8.

Furthermore, it can be seen in FIG. 8 that the clutch disk 13 for its part also has a plurality of third through holes 15. These third through holes 15 are made in the hub region 14. Like the through holes 8 and 9 earlier with the pressure 6 and the clutch cover 3 respectively, the third through holes 15 also penetrate the hub region 14 in the axial direction. The third through holes 15, for their part, are distributed around a circumferential direction. The third through holes 15, for their part, are matched to the first and second through holes 8 and 9, so that they likewise each align with one of the first through holes 8 and one of the second through holes 9. Thus, access is prepared for a tool, in order to penetrate the clutch disk 13 and the pressure element 6 as far as fastening elements in the form of screws/threaded bolts inserted into the second through holes 9, when attaching the clutch 1 to the output shaft 18. In addition, the diameter of the third through holes 15 in turn is greater than the diameter of the second through holes 9. Alternatively, the third through holes 15 may also be the same size as the second through holes 9.

It can also be seen that the counterpressure plate 16 is designed with a larger inside diameter than the outside diameter of an imagined circle, on which the through holes 8, 9 and 15 of the clutch cover 3, the pressure element 6 and the hub region 14 are positioned.

The pressure plate/counterpressure plate 16 may be made of a (relatively inexpensive) metal sheet, and/or as a flywheel. The counterpressure plate 16 may be made of a cast material/cast metal, in order to realize a high mass and stiffness.

However, the hub region 14 may also be designed in two pieces, as can be seen in the second exemplary embodiment according to FIGS. 9 and 10. In addition, in principle the third through holes 15 may also be dispensed with in the hub region. A sleeve section of the hub region 14 forming the spline toothing 23 may be formed as a forged part, while the connecting flange 24 is designed as a sheet metal part. The two-piece version of the hub region 14 again makes the cost of the clutch 1 more reasonable.

In other words, a clutch 1 is implemented as an easily installable unit. Current mass-produced clutches are frequently delivered to the customer in multiple parts. This is due to the linking of the clutch 1 (the cover 3 is screwed onto the crankshaft 8), and to the fact that there is no room available to enable passing the screws/fastening elements through the individual parts. All parts (thrust plate (pressure element 6) and clutch disk 13 if appropriate) are provided with holes 8, 15 having room for the crankshaft screws, including tool. The shape of the parts guarantees that all holes 8, 9, 15 align with each other, and, as a result, the clutch 1 can be mounted on the crankshaft 8 as a package. An additional advantage is that the clutch characteristic/imbalance can be measured in-house as a result, and that these variables are also reproducible at the customer's location. Furthermore, the increased potential for error during installation is significantly reduced. The clutch disk 13 may have a one-piece forged hub 14, or may be made in two pieces. The servo spring 17 has its contact points on the diaphragm spring pins (centering pins 21) and the clutch release plate (pressure element 6). For each contact point, the servo spring 17 has corresponding shaped arms. The support on the diaphragm spring pins 21 serves at the same time to center the servo spring 17. The clutch 1 may be actuated by means of a push rod, which is inserted through the transmission shaft 19 from the side of the transmission. The diaphragm spring 5 is actuated by means of the thrust plate 6. Under wear, the servo spring 17 intervenes with the effect of reducing force. The servo spring 17 is not actuated directly by means of the diaphragm spring 5 as in the other known applications. Rather, the servo spring 17 rests against the (pre-stressed) thrust plate 6 under pre-stressing, and the actuation of the servo spring 17 occurs through the actuation of the thrust plate 6.

In addition, the clutch 1 is an element of a clutch system that also has an actuating system, which is not shown here in the interest of clarity. The actuating system has an actuating element, which moves the clutch 1 between its engaged position and a disengaged position. The actuating element reaches partway through the clutch 1, and is coupled non-movingly with the pressure element 6.

REFERENCE LABELS

1 clutch
2 pressure plate assembly
3 clutch cover
4 contact plate
5 diaphragm spring
6 pressure element
7 edge region
8 first through hole
9 second through hole
10 drive train
11 disk region
12 flange region
13 clutch disk
14 hub region
15 third through hole
16 counterpressure plate
17 auxiliary spring
18 output shaft
19 transmission shaft
20 friction lining
21 centering pin
22 through opening
23 spline toothing
24 connecting flange
25 axis of rotation
26 protrusion

The invention claimed is:

1. A clutch for a drivetrain of a motor vehicle comprising: an axis; and,
a pressure plate assembly comprising:
a clutch cover;
a contact plate held movably on the clutch cover;
a diaphragm spring with a radial inner edge region; and,
a pressure element for actuating the diaphragm spring, wherein:
the diaphragm spring is braced between the clutch cover and the contact plate;
the pressure element rests against the radial inner edge region;
the pressure element includes a plurality of first through holes;
the clutch cover includes a plurality of second through holes; and,
each one of the plurality of first through holes is axially aligned with one of the plurality of second through holes.

2. The clutch of claim 1 wherein:
the pressure element comprises a disk region extending radially away from the diaphragm spring; and,
the plurality of first through holes is disposed in the disk region.

3. The clutch of claim 1 wherein:
the clutch cover comprises a flange region radially overlapping the diaphragm spring; and,
the plurality of second through holes is disposed in the flange region.

4. The clutch of claim 1 further comprising a clutch disk with a hub region having a plurality of third through holes.

5. The clutch of claim 4 wherein each of of the plurality of third through holes is axially aligned with one of the plurality of first through holes and one of the plurality of second through holes.

6. The clutch of claim 1 further comprising a clutch disk, wherein:
the pressure element comprises a disk region extending radially away from the diaphragm spring and comprising the plurality of first through holes;
the clutch cover comprises a flange region radially overlapping the diaphragm spring and comprising the plurality of second through holes; and,
the clutch disk comprises a hub region that comprises a plurality of third through holes each axially aligned with one of the plurality of first through holes and one of the plurality of second through holes.

7. The clutch of claim 1 wherein:
one of the plurality of first through holes comprises a first diameter;
one of the plurality of second through holes comprises a second diameter; and,
the second diameter is smaller than the first diameter.

8. The clutch of claim 1 further comprising a ring-shaped counterpressure plate with an inside diameter, wherein:
the plurality of first through holes are arranged circumferentially on an imaginary circle;
the imaginary circle comprises an outside diameter; and,
the inside diameter is greater than the outside diameter.

9. The clutch of claim 1 further comprising an auxiliary spring, wherein the pressure element is braced by the auxiliary spring.

10. The clutch of claim 9, wherein the pressure element is positioned between the diaphragm spring and the auxiliary spring.

11. A clutch system comprising:
the clutch of claim 1; and,
an actuating system comprising an actuating element, wherein:
the actuating system is arranged to move the clutch between an engaged position and a disengaged position; and,
the actuating element extends partway through the clutch and is coupled non-movingly with the pressure element.

12. A clutch for a drivetrain of a motor vehicle comprising:
an axis;
a pressure plate assembly comprising:
a clutch cover with a first through hole;
a contact plate held movably on the clutch cover;
a diaphragm spring disposed between the clutch cover and the contact plate; and,
a pressure element for actuating the diaphragm spring, the pressure element comprising a plurality of second through holes, one of the plurality of second through holes being axially aligned with the first through hole;
a clutch disk comprising a third through hole axially aligned with the first through hole and the one of the plurality of second through holes; and a ring-shaped counterpressure plate with an inside diameter, wherein:
the plurality of second through holes are arranged circumferentially on an imaginary circle;
the imaginary circle comprises an outside diameter; and,
the inside diameter is greater than the outside diameter.

13. The clutch of claim 12, wherein:
the clutch cover comprises a flange region radially overlapping the diaphragm spring and comprising the first through hole;
the pressure element comprises a disk region extending radially away from the diaphragm spring and comprising the plurality of second through holes; and,
the clutch disk comprises a hub region that comprises the third through hole.

14. The clutch of claim 13 further comprising an auxiliary spring, wherein:
the pressure element is braced by the auxiliary spring; and,
the pressure element is positioned between the diaphragm spring and the auxiliary spring.

15. A clutch for a drivetrain of a motor vehicle comprising:
an axis; and,
a pressure plate assembly comprising:
a clutch cover;
a contact plate held movably on the clutch cover;
a diaphragm spring with a radial inner edge region; and,
a pressure element for actuating the diaphragm spring; and
a ring-shaped counterpressure plate with an inside diameter, wherein:
the diaphragm spring is braced between the clutch cover and the contact plate;
the pressure element rests against the radial inner edge region and comprises a plurality of first through holes arranged circumferentially on an imaginary circle;
the clutch cover includes a second through hole axially aligned with one of the plurality of first through holes;
the imaginary circle comprises an outside diameter; and,
the inside diameter is greater than the outside diameter.

* * * * *